United States Patent [19]
Drotar et al.

[11] Patent Number: 5,492,202
[45] Date of Patent: Feb. 20, 1996

[54] VIBRATION DAMPING BRAKE PISTON FOR A MOTOR VEHICLE

[75] Inventors: Frederick L. Drotar, Newport; John C. Hoffman, Dexter; Christian A. Valachovic, Walled Lake, all of Mich.

[73] Assignee: Ford Motor Company, Dearborn, Mich.

[21] Appl. No.: 384,175

[22] Filed: Feb. 6, 1995

[51] Int. Cl.[6] ................................................. F16D 65/38
[52] U.S. Cl. ................................. 188/73.35; 188/73.37; 188/72.4; 92/215
[58] Field of Search ............................ 188/73.35, 73.36, 188/73.37, 72.4, 73.41, 250 E; 92/256, 215, 257

[56] References Cited

U.S. PATENT DOCUMENTS

| | | | |
|---|---|---|---|
| 3,625,316 | 12/1971 | Mori | 188/73.35 |
| 3,684,061 | 8/1972 | Ogawa et al. | 188/73.5 |
| 3,730,302 | 5/1973 | Ogawa et al. | 188/73.37 |
| 3,848,708 | 11/1974 | Noguchi | 188/73.1 |
| 3,885,651 | 5/1975 | Odier | 188/73.5 |
| 3,918,555 | 11/1975 | Rath | 188/73.5 |
| 4,154,322 | 5/1979 | Yamamoto et al. | 188/73.5 |
| 4,155,430 | 5/1979 | Kawamura | 188/73.5 |
| 4,240,530 | 12/1980 | Tillenburg | 188/250 E |
| 4,255,021 | 9/1980 | Kawamura et al. | 188/73.5 |
| 4,433,757 | 2/1984 | Warwick et al. | 188/72.4 X |
| 5,099,962 | 3/1992 | Furusu et al. | 188/73.37 |

FOREIGN PATENT DOCUMENTS 0029828  2/1984  Japan ................................ 188/73.37

*Primary Examiner*—Robert J. Oberleitner
*Assistant Examiner*—Peter M. Poon
*Attorney, Agent, or Firm*—Gregory P. Brown; Roger L. May

[57] ABSTRACT

A motor vehicle disc brake assembly includes a caliper (12) supporting a pair of friction elements (32,33) to be applied against opposite sides (35,37) of a rotor (14). The caliper (12) forms a cylinder bore (18) in which a brake piston apparatus (40) is slidably mounted to be actuated by hydraulic or other fluid pressure from a master cylinder (20). The brake piston apparatus (40) includes a first piston member (46) and a second piston member (60) disposed within the cylinder bore (18) and having a compliant member (82) disposed therebetween. The compliant member (82) substantially isolates the first piston member (46) from vibrations generated by friction element contact with the rotor (14), substantially eliminating operator detectable tactile vibrations.

13 Claims, 1 Drawing Sheet

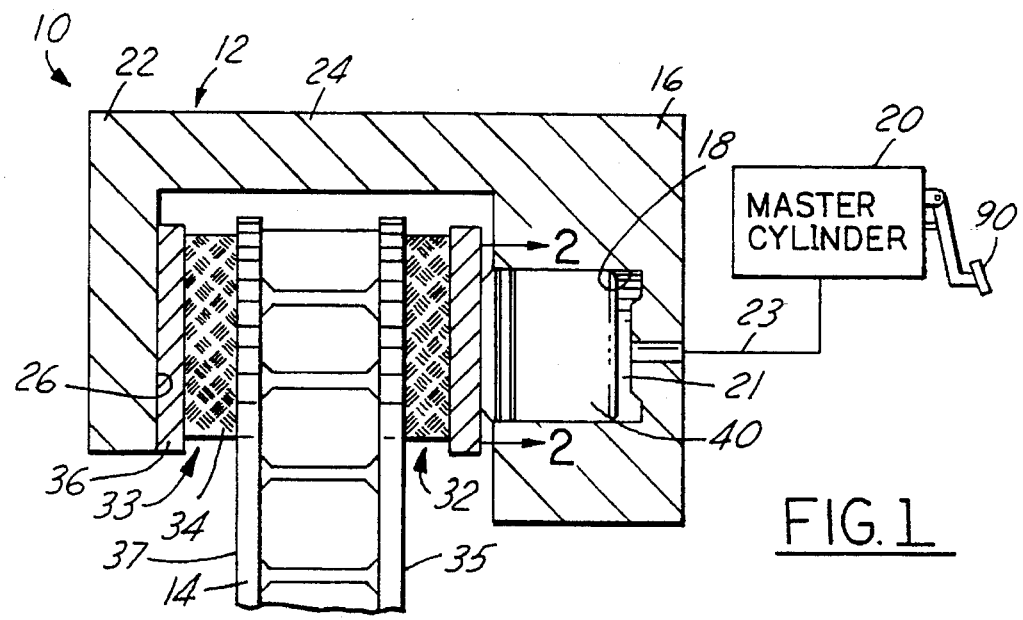
FIG.1
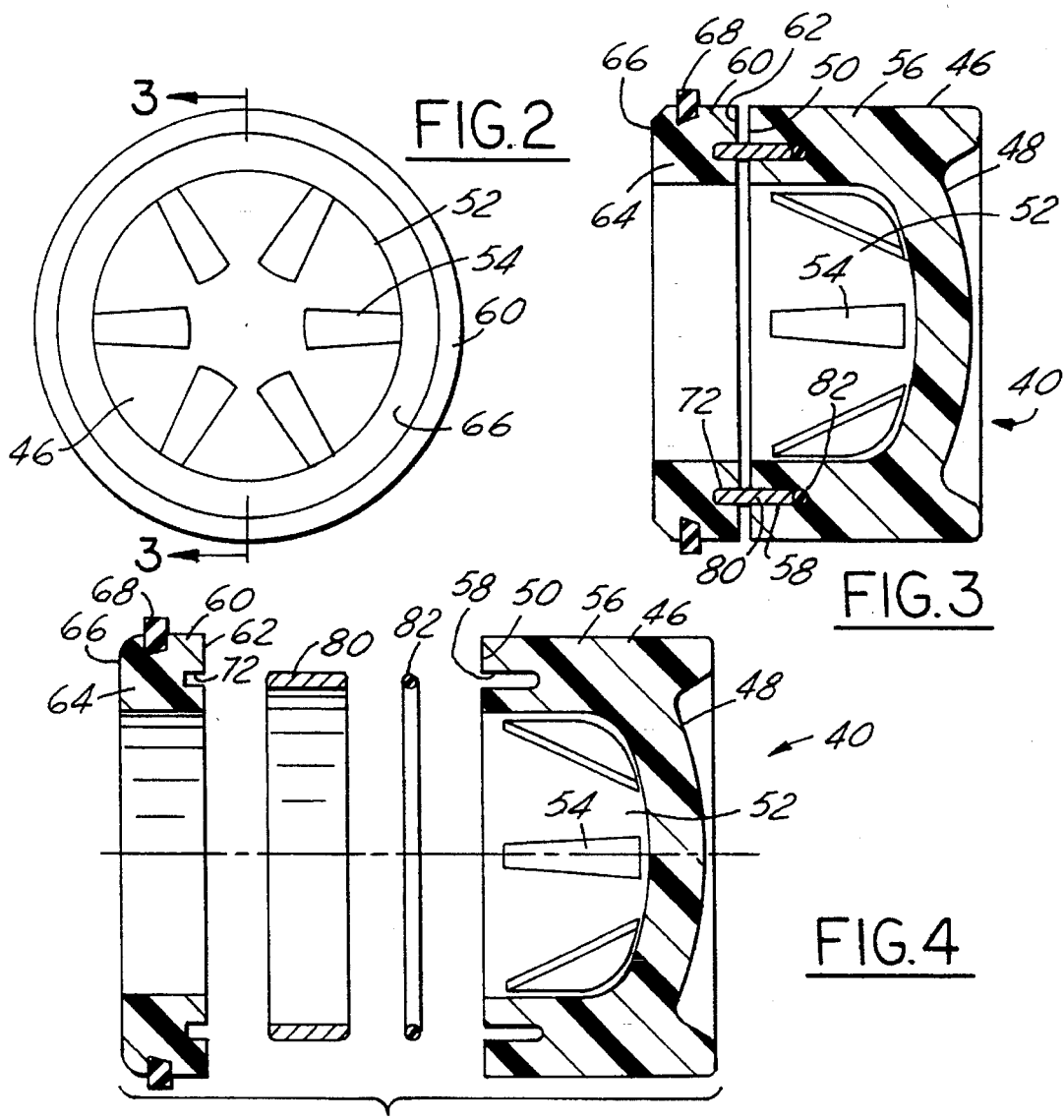
FIG.2
FIG.3
FIG.4

VIBRATION DAMPING BRAKE PISTON FOR A MOTOR VEHICLE

BACKGROUND OF THE INVENTION

1. Field of the Invention

This invention relates to disc brake assemblies for use in motor vehicles. More specifically, the present invention is directed to disc brake assemblies adapted to reduce the transmission of vibrations from the hydraulic brake system, especially those vibrations perceptible to a vehicle operator.

2. Disclosure Information

Disc brake assemblies of various designs are well known to the motor vehicle industry. Typically, disc brake assemblies include a caliper adapted to straddle a rotor and to support a pair of friction elements which are applied against opposite surfaces of the rotor to cause frictional braking. Generally one of the friction elements is mounted to a brake piston, or optionally to multiple brake pistons, which are disposed within cylinder bores formed in the caliper. Fluid pressure, generally hydraulic fluid pressure, is used to actuate the brake assembly by displacing the piston outwardly, thereby closing the gap between the friction elements and rotating rotor.

It is well known that surface irregularities in the rotor can cause vibration during vehicle braking. That is, as the working surface of the friction element is forced into contact with the surface of the rotor, the surface irregularities generate vibrations which travel through the friction element to the disc brake assembly. Especially during light to medium braking, the vibrations may be transmitted through the hydraulic system to create a tactile vibration at the brake pedal, steering wheel and floor perceptible by the vehicle operator. Such tactile braking vibrations are generally perceived adversely.

Remedial steps, such as turning the rotor to smooth its working surface, often are taken to reduce or eliminate the tactile vibrations. Also, various complex designs have been suggested for the brake piston for various purposes, some of which have included compliant members disposed between the brake piston and the friction element. One example of such a design is disclosed in UK patent application GB 2185547 of Osthoff et al., where an annular compliant member is interposed between a friction element and the brake piston, with curvature at the edges of the annular member to avoid friction between the piston and the brake shoe. The compliant members in these various prior arrangements, however, are subject to environmental deterioration and wear due to movement between the brake shoe and the brake piston. As the compliant member deteriorates, the tactile vibrations generated during vehicle braking are increasingly transmitted to the vehicle operator.

It would therefore be desirable to have a brake piston assembly having an environmentally protected internal compliant member for reducing the transmission of tactile vibrations to the vehicle operator during low and medium effort braking.

SUMMARY OF THE INVENTION

The present invention provides a vibration damping brake piston for use in a brake caliper of a motor vehicle. In the presently preferred embodiment the brake piston apparatus includes a first piston member slidably disposed within a cylinder bore of the brake caliper. The first piston member has a hydraulic reaction face in communication with hydraulic fluid within the brake caliper and a first end opposite the hydraulic reaction face. The brake piston apparatus also includes a second piston member slidably disposed within the cylinder bore. The second piston member includes a second end adjacent to the first end of the first piston member and an operating face for urging a friction element against a rotor.

The brake piston apparatus further includes a compliant member positioned between the first end of the first piston member and the second end of the second piston member. The compliant member is adapted to urge the first piston member into a spaced apart relationship with the second piston member, whereby the first piston member and the brake caliper are isolated from vibrations caused by surface variations in said rotor.

It is an advantage of the vibration damping brake piston to reduce the transmission of tactile vibrations to the vehicle suspension, steering system and brake pedal during low to medium vehicle braking. It is a further advantage of the present invention to provide an internal compliant member protected from the surrounding environment to reduce its deterioration.

Other objects, features and advantages of the present invention will become apparent to those skilled in the art from the drawings, detailed description and claims which follow.

BRIEF DESCRIPTION OF THE DRAWINGS

FIG. 1 is a sectional view of a disc brake assembly for a motor vehicle according to the present invention.

FIG. 2 is an elevational view of a brake piston assembly according to the present invention.

FIG. 3 is a is a sectional view taken from FIG. 2 of a brake piston assembly according to the present invention.

FIG. 4 is an exploded sectional view taken from FIG. 2 of a brake piston assembly according to the present invention.

DETAILED DESCRIPTION OF THE PREFERRED EMBODIMENTS

Referring now to FIG. 1, a motor vehicle disc brake assembly 10 is seen to comprise a caliper 12 straddling a rotor 14. A first side 16 of caliper 12 forms a cylinder bore 18 in fluid communication with a master cylinder 20 for feeding hydraulic or other fluid 21 to the bore through a fluid channel 23. The second side 22 of caliper 12 is integral, preferably unitary with the first side in the ordinary manner via bridging member 24. Side 22 of caliper 12 forms a fixed position reaction face 26. In general, the caliper 12 may be fashioned in accordance with well known design and manufacturing technology.

First and second friction elements 32, 33 are maintained in operating positions adjacent to first and second surfaces 35, 37 of rotor 14 by the caliper 12. Friction elements 32, 33 each comprise a brake pad 34 shown in surface-to-surface contact with the first surface 35 of rotor 14 as it would be during vehicle braking. The brake pad 34 may be any suitable friction lining element, of which various suitable materials and designs are well known to those skilled in this area of technology. It is mounted to a substantially rigid backing plate 36. A brake piston 40 is slidably disposed within the cylinder bore 18 for actuating the friction elements 32, 33 in response to the fluid pressure in the cylinder bore 18.

Referring now to FIGS. 2–4, the brake piston 40 includes a first piston member 46 having a hydraulic reaction face 48 in direct communication with the fluid 21 in the cylinder bore 18. The first piston member 46 also includes a first end 50 opposite the hydraulic reaction face 48. In the presently preferred embodiment the first piston member 46 has a cavity 52 with reinforcing ribs 54 extending partially toward the first end 50 along a first piston wall 56. A first groove 58 protrudes through the first end 50 and extends into the first wall 56.

The brake piston 40 further includes a second piston member 60 slidably disposed within the cylinder bore 18 having a second end 62 adjacent to the first end 50 of the first piston member 46. A second wall 64 extends from the second end 62 to an operating face 66 and includes a seal 68 disposed on an outer surface 70. The second piston member 60 includes a second groove 72 axially protruding through the second end 62 into the second wall 64.

In the presently preferred embodiment, an arcuate plate 80 slidably engages the first and second grooves 58, 72 to provide positive axial alignment within the cylinder bore 18. It should be readily apparent to one skilled in the art many guiding devices could perform this function with equivalent operability. For instance, the first and second grooves 58, 72 could be replaced with apertures and matching guide pins.

The presently preferred embodiment also includes a compliant O-ring 82 disposed within the first groove 58 adjacent to the arcuate plate 80. As with the arcuate plate 80, the compliant O-ring 82 is merely representative of an efficient manner to resiliently oppose relative axial motion between the first and second piston members 46, 60. It should be readily apparent to one skilled in the art, in light of the teachings herein, that many compliant devices could be inserted between the first and second piston members 46, 60 for resiliently resisting relative axial motions therebetween. For instance, a single resilient member could be substituted in place of the arcuate plate 80 and O-ring 82 combination, where axial alignment is not critical.

In the presently preferred embodiment, the arcuate plate is machined from SAE 316 stainless steel bar stock. The stainless steel provides minimal corrosion, enhancing its useful life. The O-ring is made from a neoprene rubber to withstand extended exposure to the hydraulic fluid. The durometer of the O-ring 82 is a matter of design for the particular application. The configuration of the compliant member and guide device will depend upon the design of the tolerance between the brake piston 40 and the cylinder bore 18. More generally, the configuration and material selected for the compliant member and guide device will vary from one application to another, depending upon the design and performance characteristics intended for the brake assembly. Additional suitable materials for the compliant member and guide device are commercially available and will be readily apparent to those who are skilled in this area of technology in light of the present disclosure. Similarly, it is will well within the ability of those so skilled to design alternative configurations for the compliant member, meeting the needs of particular brake assembly applications.

It will be recognized by those who are skilled in the brake piston area of technology that the first and second piston members 46, 60 can be made in accordance with alternative designs, including more complicated multi-component designs of metal, phenolic or other materials.

Operation of the present invention will now be described with reference to FIGS. 1 and 3. Brake piston 40 is actuated by an operator exerting a brake effort on a brake pedal 90, which in turn creates a hydraulic pressure within the fluid channel 23 and the cylinder bore 18. A brake force is generated proportional to the hydraulic pressure as a function of the area of the hydraulic reaction face 48 of the first piston member 46. This forces the friction elements 32, 33 into frictional contact with the rotor 14. During low to medium effort braking, surface variations in the rotor 14 may cause the friction elements to vibrate axially, which may in turn cause the second piston member 60 to vibrate axially. Additionally, during low to medium effort braking there is reduced torsional vibration due to torque variation created in the caliper assembly since the second piston member follows the surface variations in the rotor.

In a conventional piston configuration, this vibration is transmitted through the hydraulic system to the pedal and structural system to the steering column and floor, where the operator detects an undesirable vibration. However, in the presently preferred embodiment of the present invention, the O-ring 82 maintains a gap between the first and second piston members 46, 60, thereby allowing the O-ring 82 to absorb these vibrations and effectively isolate the first piston member 46 and the hydraulics from the undesirable vibration of the second piston member 60. When the brake force exceeds a predetermined level sufficient to compress the O-ring 82, the gap between the first and second ends 50, 62 collapses and the first and second piston members 46, 60 contact one another providing operational characteristics equivalent to a conventional brake piston. When the brake effort drops below the predetermined minimum, the O-ring progressively forces the first and second piston members 46, 60 into a spaced apart relationship. In addition to providing a protected environment for the compliant member, this configuration eliminates a soft or spongy feeling pedal, which many operators would consider unacceptable.

The foregoing description presents one embodiment of the present invention. Details of construction have been shown and described for purposes of illustration rather than limitation. Modifications and alterations of the invention may occur to those skilled in the art. It is the following claims, including all equivalents, which define the scope of our invention.

We claim:

1. A brake piston apparatus for use in a brake caliper of a disc brake assembly in a motor vehicle, said brake piston apparatus comprising:

a first piston member slidably disposed within a cylinder bore of said brake caliper, said first piston member having a hydraulic reaction face in communication with hydraulic fluid within said brake caliper and a first end opposite said hydraulic reaction face;

a second piston member slidably disposed within said cylinder bore having a second end adjacent to said first end of said first piston member and an opposite operating face end opposite said second for urging a friction element against a rotor; and a compliant member positioned between said first end of said first piston member and said second end of said second piston member, said compliant member being adapted to urge said first piston member into a spaced apart relationship with said second piston member, whereby said first piston member and said brake caliper are isolated from vibrations caused by surface variations in said rotor.

2. A brake piston apparatus according to claim 1, wherein said brake piston apparatus further comprises guide means slidably disposed between said first end of said first piston and said second end of said second piston for axially aligning said first and second piston members within said cylinder bore.

3. A brake piston apparatus according to claim 2, wherein said brake piston apparatus further comprises:

a first groove circumferentially disposed in said first end of said first piston member; and a second groove circumferentially disposed in said second end of said second piston member and axially aligned with said first groove, said compliant member being disposed within said first and second grooves.

4. A brake piston apparatus according to claim 3, wherein said guide means comprises an arcuate plate slidably disposed within said first and second grooves, said arcuate plate being adapted to maintain alignment of said first and second piston members within said cylinder bore.

5. A brake piston apparatus according to claim 4, wherein said compliant member comprises a compliant O-ring disposed within said first groove adjacent to said guide member, said compliant O-ring being adapted to isolate said first piston member from axial vibrations of said second piston member.

6. A disc brake assembly for use in a motor vehicle, said disc brake assembly comprising:

caliper means for straddling a rotor and supporting friction elements to be applied against opposite sides of said rotor, said caliper means having a first side forming a cylinder bore and a fluid channel in communication with said cylinder bore;

a brake piston slidably mounted within said cylinder bore for axial displacement in response to fluid pressure communicated to said cylinder bore via said fluid channel, said brake piston comprising:

a first piston member disposed within said cylinder bore and having a first end;

a second piston member disposed within said cylinder bore and having a first and second end, said first end of said second piston member urging at least one of said friction elements against said rotor and said second end adjacent to said first end of said first piston member; and a compliant member disposed between said first end of said first piston member and said second end of said second piston member, whereby said compliant member is operative to isolate said first piston member and said brake caliper from vibrations of said second piston member during low to medium effort braking.

7. A disc brake assembly according to claim 6, wherein said brake piston further comprises guide means slidably disposed between said first end of said first piston and said second end of said second piston for axially aligning said first and second piston members within said cylinder bore.

8. A disc brake assembly according to claim 7, wherein said brake piston further comprises:

a first groove circumferentially disposed in said first end of said first piston member; and a second groove circumferentially disposed in said second end of said second piston member and axially aligned with said first groove, said compliant member being disposed within said first and second grooves.

9. A disc brake assembly according to claim 8, wherein said guide means comprises an arcuate plate slidably disposed within said first and second grooves, said arcuate plate being adapted to maintain alignment of said first and second piston members within said cylinder bore.

10. A brake piston apparatus according to claim 9, wherein said compliant member comprises a compliant O-ring disposed within said first groove adjacent to said guide member, said compliant O-ring being adapted to isolate said first piston member from axial vibrations of said second piston member.

11. A brake piston apparatus for use in a disc brake caliper of a disc brake assembly in a motor vehicle, said brake piston apparatus comprising:

a first piston member slidably disposed within a cylinder bore of said brake caliper, said first piston member having a hydraulic reaction face in communication with hydraulic fluid within said cylinder bore and a first groove circumferentially disposed in a first end opposite said hydraulic reaction face;

a second piston member slidably disposed within said cylinder bore, said second piston member having a second groove circumferentially disposed in a second end adjacent to and axially aligned with said first end of said first piston member and an operating face opposite said second end for urging a friction element against a rotor;

guide means slidably disposed within said first groove and said second groove for maintaining axial alignment of said first and second piston members within said cylinder bore; and a compliant member positioned between said first end of said first piston member and said second end of said second piston member, said compliant member being adapted to urge said first piston member into a spaced apart relationship from said second piston member, whereby said first piston member and said brake caliper are isolated from vibrations caused by surface variations in said rotor.

12. A disc brake assembly according to claim 11, wherein said guide means comprises an arcuate plate slidably disposed within said first and second grooves.

13. A brake piston apparatus according to claim 11, wherein said compliant member comprises a compliant O-ring disposed within said first groove adjacent to said guide means.

\* \* \* \* \*